United States Patent
Jin

(10) Patent No.: US 9,445,041 B2
(45) Date of Patent: Sep. 13, 2016

(54) MOVING IMAGE DATA PROCESSING APPARATUS AND MOVING IMAGE DATA PROCESSING METHOD

(71) Applicant: JVC KENWOOD Corporation, Yokohama-shi (JP)

(72) Inventor: Akiyoshi Jin, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 81 days.

(21) Appl. No.: 14/141,238

(22) Filed: Dec. 26, 2013

(65) Prior Publication Data

US 2014/0186006 A1    Jul. 3, 2014

(30) Foreign Application Priority Data

Dec. 28, 2012  (JP) ................ 2012-288402

(51) Int. Cl.
| | |
|---|---|
| *H04N 5/775* | (2006.01) |
| *H04N 5/77* | (2006.01) |
| *H04N 5/783* | (2006.01) |

(52) U.S. Cl.
CPC .............. *H04N 5/772* (2013.01); *H04N 5/783* (2013.01)

(58) Field of Classification Search
CPC .............................. H04N 5/783; G11B 27/005
USPC ................................................. 386/230, 343
See application file for complete search history.

(56) References Cited

U.S. PATENT DOCUMENTS

2010/0310229 A1*  12/2010  Iwata ........................ 386/222

FOREIGN PATENT DOCUMENTS

| JP | 2004-363707 A | 12/2004 |
|---|---|---|
| JP | 2008-288934 A | 11/2008 |
| JP | 2011-244328 A | 12/2011 |

* cited by examiner

*Primary Examiner* — Hung Dang
*Assistant Examiner* — Girumsew Wendmagegn
(74) *Attorney, Agent, or Firm* — Venable LLP; Michael A. Sartori; F. Brock Riggs

(57) ABSTRACT

A moving image data processing apparatus receives input of first and second image data with a first and second frame rate respectively. The apparatus includes; an input frame rate specification unit that specifies the first and the second frame rate of the moving image data; an output frame rate specification unit that specifies output frame rates of the first and second moving image data; a playback speed specification unit that specifies same playback speed for the first and second moving image data; a frame rate conversion unit that changes a frame rate of the first moving image data based on the first frame rate, the output frame rate, and the playback speed, and changes a frame rate of the second moving image data based on the second frame rate, the output frame rate, and the playback speed; and an output unit that outputs the changed moving image data.

6 Claims, 10 Drawing Sheets

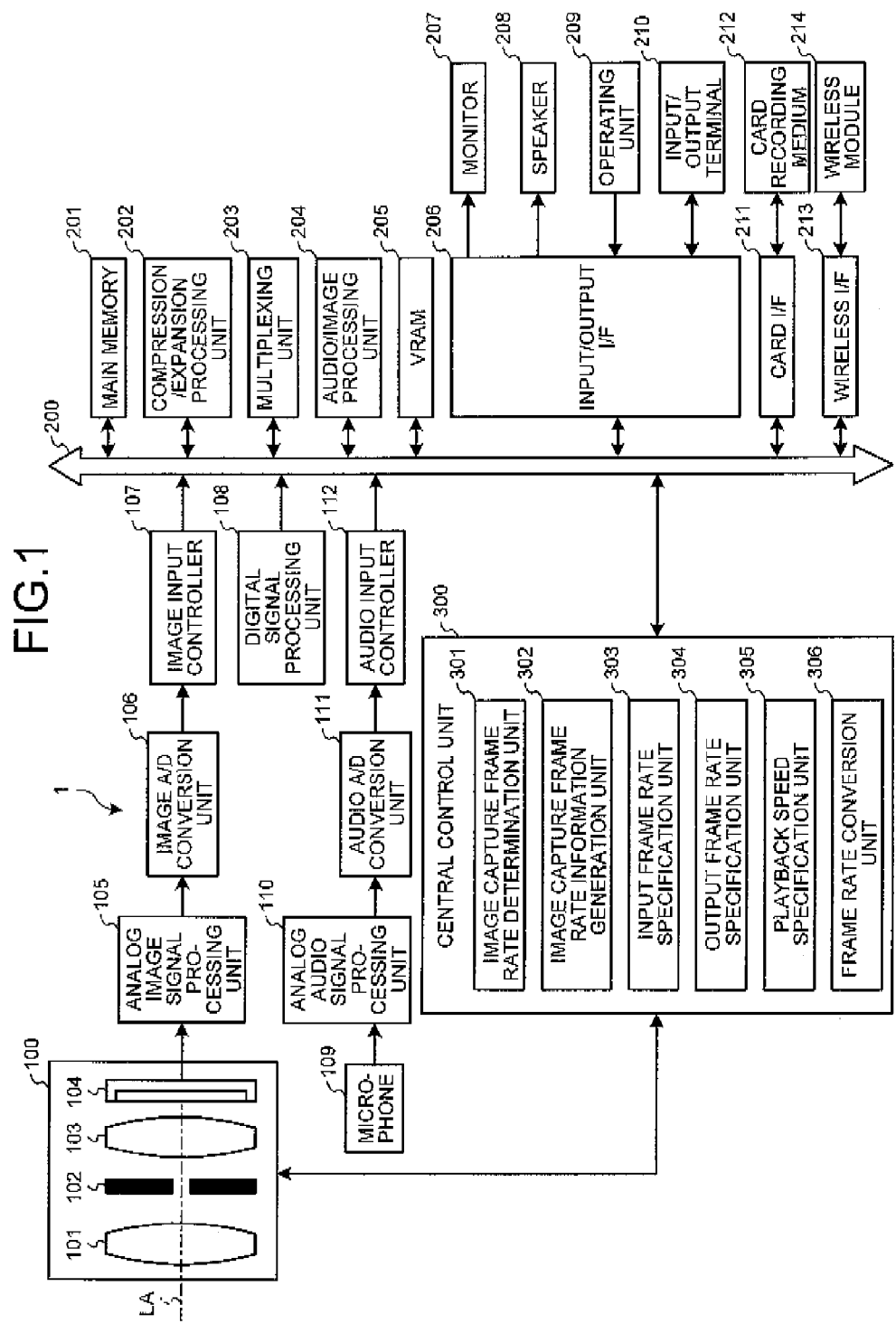

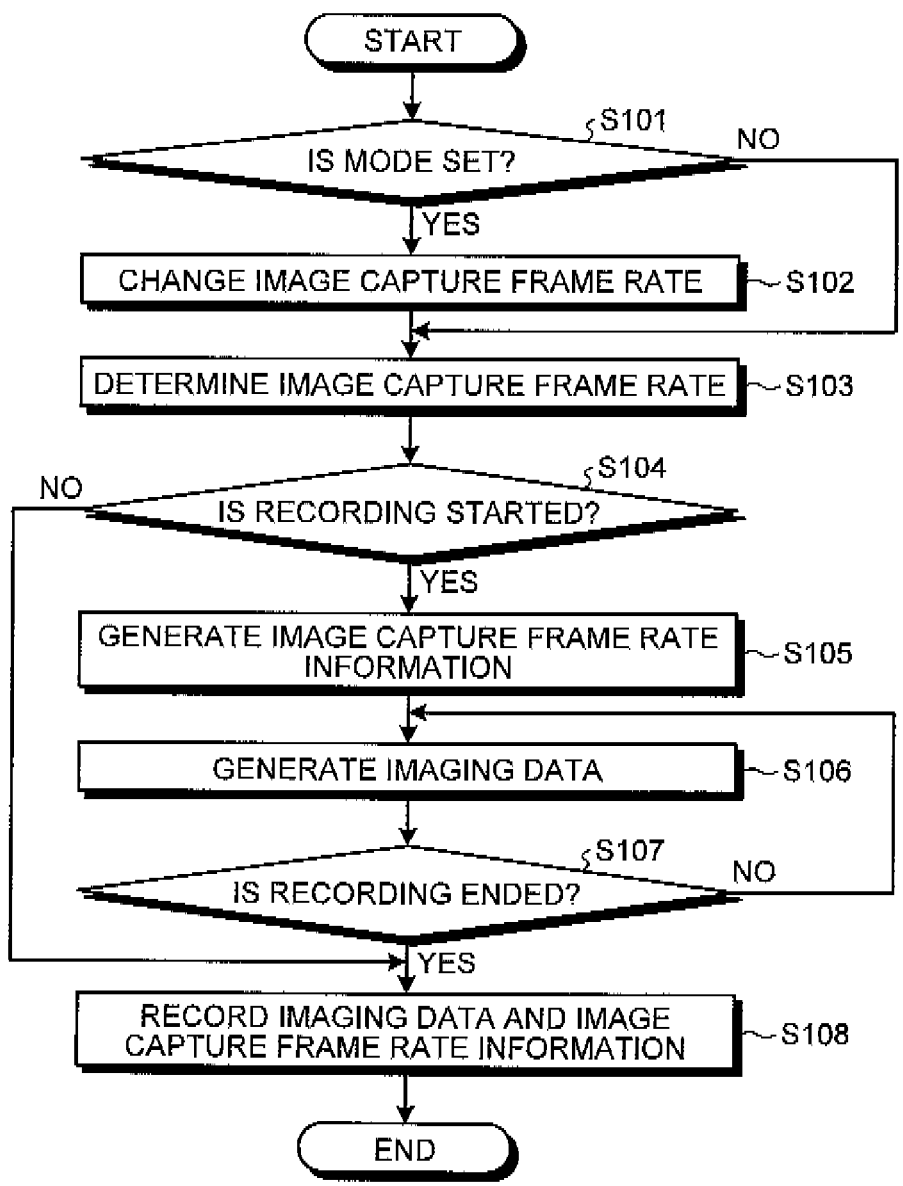

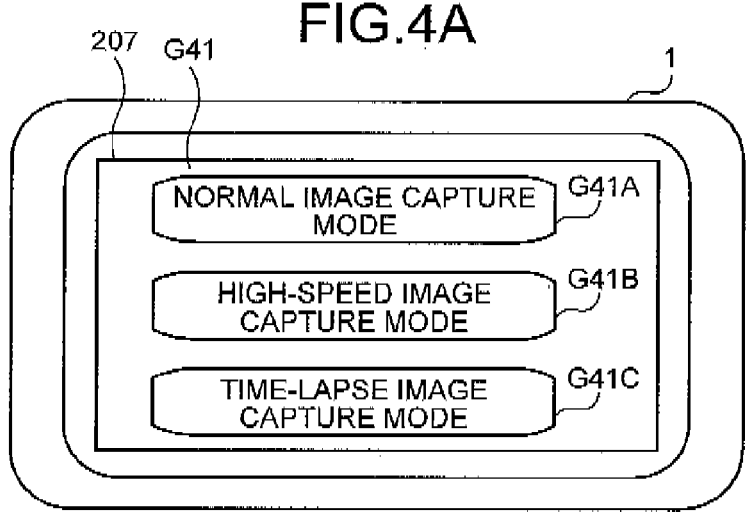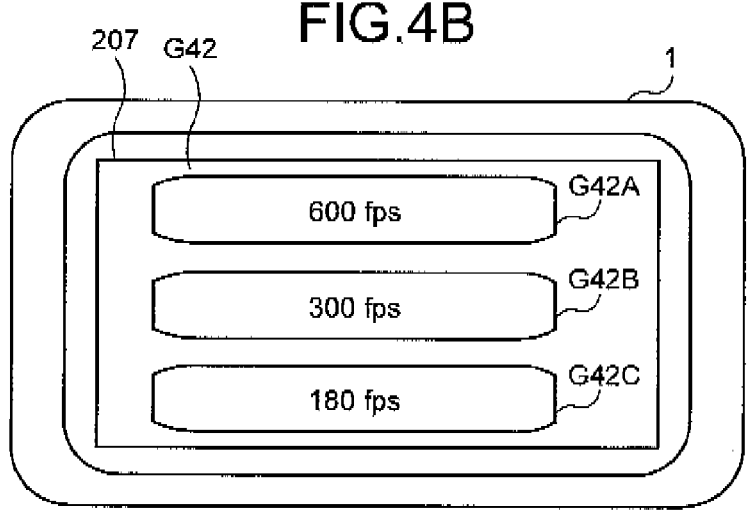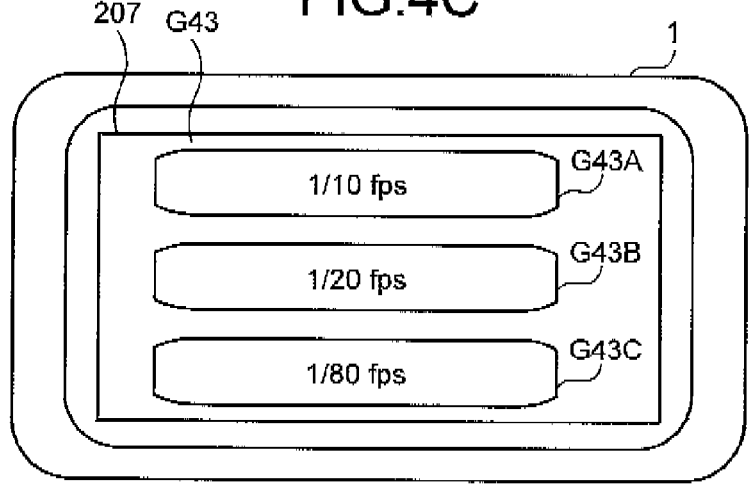

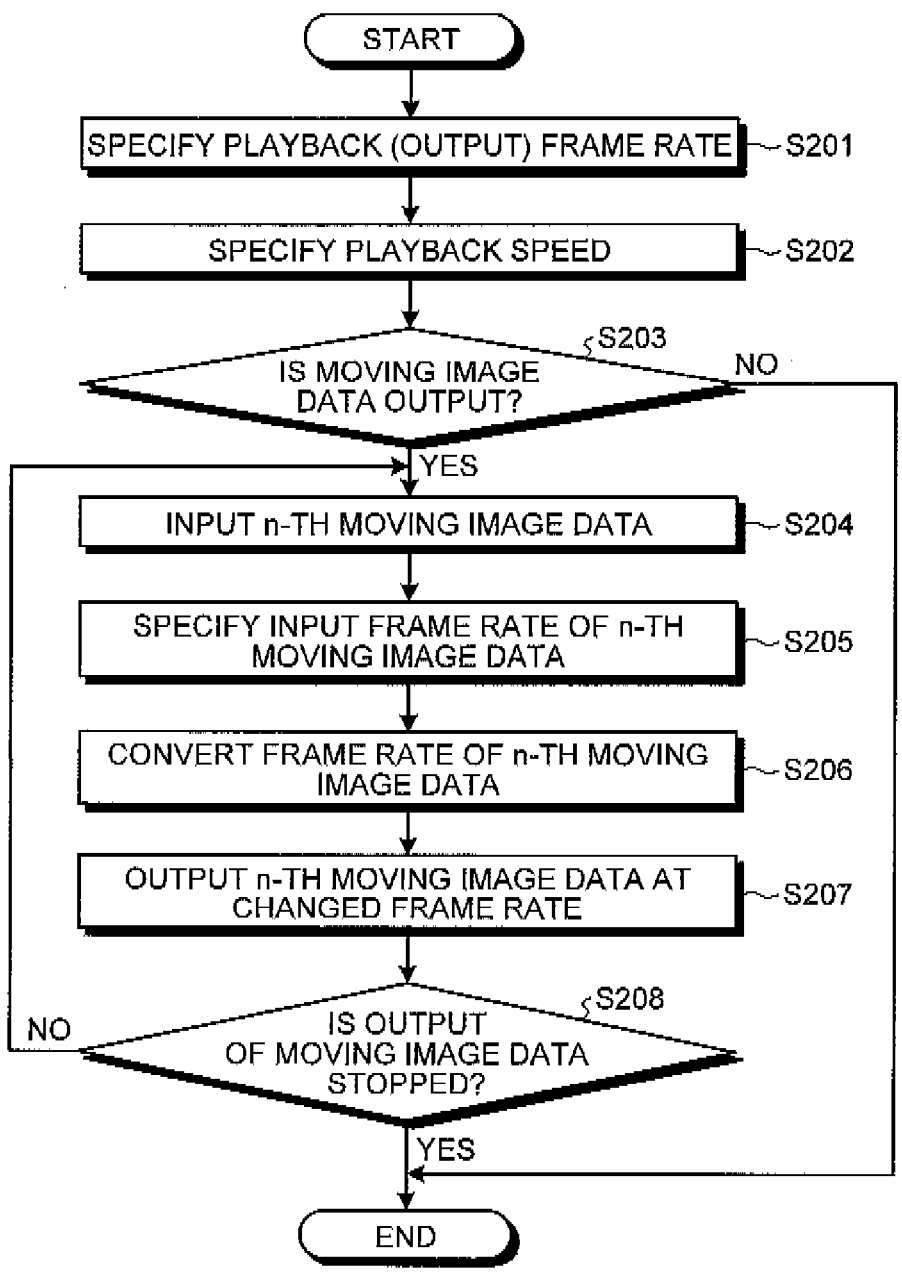

MOVING IMAGE DATA PROCESSING APPARATUS AND MOVING IMAGE DATA PROCESSING METHOD

CROSS-REFERENCE TO RELATED APPLICATIONS

The present application claims priority to and incorporates by reference the entire contents of Japanese Patent Application No. 2012-288402 filed in Japan on Dec. 28, 2012. The present document incorporates by reference the entire contents of Japanese Patent Application No. 2012-212025 filed in Japan on Sep. 26, 2012.

BACKGROUND OF THE INVENTION

1. Field of the Invention

The present invention relates to a moving image data processing apparatus and a moving image data processing method and, in more detail, relates to a moving image data processing apparatus and a moving image data processing method that make it possible to easily play back moving image data generated at various frame rates at a predetermined frame rate and playback speed.

2. Description of the Related Art

In recent years, a user sets different frame rates according to imaging data to capture various scenes and subjects, which has become common not only in business use imaging apparatuses but also in home use imaging apparatuses. The following is an example of image capture using different frame rates.

In image capture of scenes of a travel, a birthday party of a user's family, and the like, general frame rates such as 30 fps (Frames Per Second) and 60 fps are used. In contrast, when a user wishes to obtain imaging data that allows the recognition of the smooth motion of a subject even if the motion of the subject is quick for example when capturing a sport scene and the like, high frame rates such as 300 fps and 600 fps are used. Moreover, when a user captures a subject that makes subtle changes over a long time for example, when capturing a plant growing scene, low frame rates such as 1/20 fps and 1/80 fps are used.

A frame rate of 1/N fps (N is an integer equal to or more than one) such as 1/20 fps and 1/80 fps used here indicates a rate at which a frame related to one still image is captured at a predetermined moment in every N seconds. Therefore, for example at 1/20 fps, generated is a frame where a scene/subject is captured at a specific moment of every 20 seconds.

Thus, it is desirable that imaging data generated at various frame rates at the image capturing can be played back at various frame rates and playback speeds when viewing for the purposes. Moreover, some playback apparatuses can originally play back imaging data only at a limited frame rate, such as only at 60 fps.

For example, it is desirable to play back 10 minutes' imaging data at 600 fps, which has been generated by capturing a sport scene at 600 fps for 10 minutes, for the purpose of viewing the smooth motion of a subject image. On the other hand, for the purpose of playback in slow motion and checking minute points of the subject image, playback at a lower frame rate (for example 60 fps) and a lower playback speed (for example a playback speed of 100 minutes for all the imaging data) may be desired.

Moreover, in a case where a display apparatus viewed by a user is originally designed only at a limited frame rate (for example 60 fps), after captured frames are processed with decimation or interpolation (for example decimated so that the total number of the frames becomes 1/10) so that a playback time from start to end be set to the same 10 minutes and played back at a speed same as the original captured imaging data. In addition, also in this case, it is also desirable that the playback speed can be made faster or slower.

This is the same for a moving image data captured at a lower frame rate than at a normal rate.

Imaging data generated at a frame rate of 12 fps upon image capture, if viewed at a higher frame rate, can generally be seen of the change of a subject in a shorter time than the actual image capture time. On the other hand, in a case where some kind of a change is to be checked in detail and where an operation is to be edited into a certain stage of the image, playback at a slower speed than the viewing may be desired.

While it is becoming common to generate imaging data, or moving image data at various frame rates, there is much room for improving an environment where a user plays back these moving image data at a desired frame rate and at a playback speed. For example, even if users wish to sequentially/continuously play back a plurality of imaging data generated at different frame rates, many users are in an environment where a frame rate and a playback speed that are used for playback need to be appropriately set for each piece of the imaging data. Moreover, as described above, some display apparatus a user has may be originally set to playback only at a limited frame rate, such as 30 fps and 60 fps.

Considering into what is described above, have been developed an imaging apparatus and a playback apparatus for generating imaging data (moving image data) at different frame rates, and allowing a user to more easily play back the plurality of moving image data generated at the different frame rates. For example, Japanese Patent Application Laid-open No. 2008-288924 describes a moving image capture apparatus and a moving image playback apparatus that can playback with a simple operation at a slow motion speed or quick motion speed that a person who captured the image intends.

The moving image capture apparatus described in Japanese Patent Application Laid-open No. 2008-288934 includes a frame rate setting unit that arbitrarily sets: a recording frame rate indicating the number of frames per unit time while capturing a moving image; a valid frame rate indicating the number of frames per unit time of valid frames that are moving image playback targets out of frames captured as the moving image; and a playback frame rate that is the number of frames per unit time while playing back the valid frames, respectively. The recording frame rate, valid frame rate, and playback frame rate are associated with each other to be recorded in a recording medium. The moving image playback apparatus and the like refer to these pieces of information upon playback; and accordingly a user can perform playback in slow motion or quick motion that a person who captured the image intended, and can perform smooth playback when the playback speed is changed.

However, the imaging apparatus described in Japanese Patent Application Laid-open No. 2008-288934 sets and records the recording frame rate, the playback frame rate, and the valid frame rate upon the generation of imaging data. Therefore, even when a user wishes to change the frame rate at the time of playback to a different frame rate from the three kinds set upon the image capture, it is considered to have a problem that the imaging data can be played back only at any of the frame rates. The same issue occurs in the playback speed.

When a plurality of imaging data with different frame rates are to be sequentially or continuously played back, and when a user wishes to set a frame rate and playback speed used for their playback to be predetermined frame rate and playback speed, there can be a problem that a user needs to set a frame rate at the time of image capture considering into the playback speed. In addition, the user must consider and set the three kinds of frame rates, the recording frame rate, the playback frame rate, and the valid frame rate, which is troublesome for the user in the first place and which may give a load to the imaging apparatus.

SUMMARY OF THE INVENTION

There is a need to at least partially solve the problems in the conventional technology.

According to an aspect of the present invention, provided is a moving image data processing apparatus that includes: a moving image data input unit configured to be input of first moving image data generated at a first frame rate and second image data generated at a second frame rate that is different from the first frame rate; an input frame rate specification unit configured to specify the first frame rate of the first moving image data and the second frame rate of the second moving image data, the first and second moving image data having been input into the moving image data input unit; an output frame rate specification unit configured to specify output frame rate of the first moving image data and output frame rate of the second moving image data that have been input into the moving image data input unit; a playback speed specification unit configured to specify a same playback speed for the first moving image data and the second moving image data; a frame rate conversion unit configured to change a frame rate of the first moving image data based on the first frame rate, the output frame rate, and the playback speed, and change a frame rate of the second moving image data based on the second frame rate, the output frame rate, and the playback speed; and a moving image data output unit that outputs the first and second moving image data whose frame rates have been converted by the frame rate conversion unit.

According to another aspect of the present invention, provided is a moving image data processing method that includes: inputting first moving image data generated at a first frame rate and second image data generated at a second frame rate that is different from the first frame rate; specifying the first frame rate of the first moving image data and the second frame rate of the second moving image data, the first and second moving image data having been input; specifying output frame rate of the first moving image data and output frame rate of the second moving image data that have been input specifying a same playback speed for the first moving image data and the second moving image data; changing a frame rate of the first moving image data based on the first frame rate, the output frame rate, and the playback speed, and changing the frame rate of the second moving image data based on the second frame rate, the output frame rate, and the playback speed; and outputting the first and second moving image data whose frame rates have been changed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a schematic internal configuration of an imaging apparatus 1;

FIG. 3 is a flowchart illustrating an image capture process by the imaging apparatus 1;

FIGS. 4A to 4C are diagrams illustrating an example of a screen for selecting an image capture mode and an image capture frame rate;

FIG. 6 is a flowchart illustrating a playback process of moving image data by the imaging apparatus;

DETAILED DESCRIPTION OF THE PREFERRED EMBODIMENTS

Figure 2A:
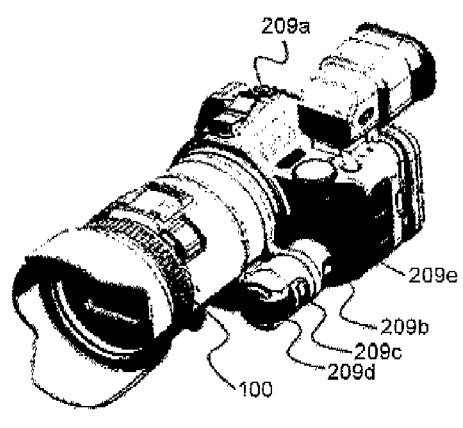
FIGS. 2A and 2B are exterior views illustrating the appearance of the imaging apparatus 1.

Hereinafter, preferred embodiments of a moving image data processing apparatus and a moving image data processing method according to the present invention will be described with reference to the drawings. Specific numerical values and the like illustrated in the embodiments are mere illustrations to facilitate an understanding of the invention, and do not limit the present invention unless otherwise specified. In the specification and drawings, the same reference numerals are assigned to components having substantially the same functions or configurations and accordingly the duplicate descriptions are omitted. The illustrations of components that are not directly relevant to the present invention are omitted.

Entire Configuration and Appearance of an Imaging Apparatus 1

Figure 2B:
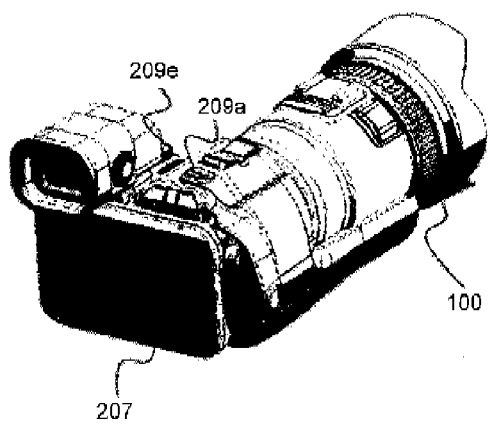

Firstly, the configuration and appearance of an imaging apparatus 1 according to present embodiment will be described with reference to FIGS. 1, 2A, and 2B. FIG. 1 is a block diagram illustrating a schematic internal configuration of the imaging apparatus 1. FIGS. 2A and 2B are exterior views illustrating the appearance of the imaging apparatus 1. FIG. 2A illustrates a perspective view when viewing the imaging apparatus 1 from the front. FIG. 2B illustrates a perspective view when viewing the imaging apparatus 1 from the back. The imaging apparatus 1 can capture a moving image and a still image.

A central control unit 300 is constituted by a semiconductor integrated circuit including a CPU (Central Processing Unit), a ROM (Read Only Memory) where various programs are stored, and a RAM (Random Access Memory) as a work area. The central control unit 300 centrally controls an image capture process described below, that is, a process of generating moving image data, and a process of playing back the moving image data. Moreover, the central control unit 300 centrally controls also various other processes such as: a process of displaying various images such as a menu image that allows a user to perform various settings; a process of generating/recording various data; and a process of controlling an imaging unit 100. Instructions related to the controls are transmitted to units described below via a bus 200.

The imaging apparatus 1 includes the imaging unit 100 constituted by a zoom lens 101, a diaphragm 102, a focusing lens 103, and an imaging device 104. The zoom lens 101 moves along an optical axis LA by an unillustrated zoom actuator. The focusing lens 103 similarly moves along the optical axis LA by an unillustrated focus actuator. The diaphragm 102 is driven by an unillustrated diaphragm actuator to adjust exposure. The imaging device 104 is constituted by a CMOS (Complementary Metal Oxide Semiconductor), a CCD (Charge Coupled Device), or the like. The appearance of the imaging unit 100 is as illustrated in FIGS. 2A and 2B.

Photoelectric conversion is performed by the imaging device 104 on light that has passed through the zoom lens 101, the diaphragm 102, and the focusing lens 103; and the light becomes an analog image signal. An analog image signal processing unit 105 amplifies the analog image signal. An image A/D conversion unit 106 then converts the amplified signal into digital image data.

An image input controller 107 captures the digital image data output from the image A/D conversion unit 106 as imaging data, and stores the data in a main memory 201 via the bus 200.

Here, a digital signal processing unit 108 converts the digital image data, output from the image A/D conversion unit 106, with predetermined procession into imaging data including a brightness signal and a color difference signal. The digital signal processing unit 108 also performs various digital processes such as an offset process, a white balance adjustment process, a gamma correction process, an RGB interpolation process, a noise reduction process, a contour correction process, a tone correction process, and a light source type determination process.

A microphone 109 collects a surrounding sound upon image capture and generates an analog audio signal. An analog audio signal processing unit 110 amplifies the analog audio signal. An audio A/D conversion unit 111 then converts the amplified signal into digital audio data. An audio input controller 112 stores the digital audio data output from the audio A/D conversion unit 111 together with the imaging data in the main memory 201.

A compression/expansion processing unit 202 performs a predetermined compression process on various data stored in the main memory 201 and generates compressed data. Further, the compression/expansion processing unit 202 performs an expansion process in a predetermined format on the compressed data stored in a card recording medium 212 and the like based on the instruction from the central control unit 300, and generates non-compressed data. In the imaging apparatus 1 of the embodiment, a compression format in conformity with the JPEG standard is adopted for a still image, and a compression format in conformity with the MPEG2 standard, the AVC/H.264 standard, the Motion JPEG standard, or the like is adopted for a moving image.

A multiplexing unit 203 multiplexes various data including digital image data and digital audio data to generate stream data.

An audio/image processing unit 204 performs predetermined image processing on the above digital image data read from the main memory 201; and separately generates image data on an image to be displayed on a monitor 207. For example, the audio/image processing unit 204 generates image data on various menu images related to the settings of the imaging apparatus 1, including an image that prompts a user to select an <image capture mode> described below. Moreover, the audio/image processing unit 204 generates image data on an image to present the user with the number, content, and the like about the imaging data stored in the card recording medium 212 and the like, as well as generating a thumbnail image thereabout. These pieces of the generated image data are output to the monitor 207 and the like via an input/output I/F 206.

A VRAM 205 is used as a temporary storage area for image data for display. Moreover, the main memory 201 is used as a temporary storage area of various image data and also used as a computation work area of the central control unit 300.

The monitor 207, a speaker 208, an operating unit 209, and an input/output terminal 210 are connected to the input/output I/F 206. Each of the units is described below.

The monitor 207 is constituted by, for example, a liquid crystal display or an organic EL (Electroluminescence) display. The monitor 207 displays the imaging data that is temporarily stored in the main memory 201 as what is called a through image, and displays the image data recorded in the card recording medium 212 and the like. The speaker 208 outputs sounds and the like accompanied with the image data recorded in the card recording medium 212 and the like.

The operating unit 209 is constituted by a release button 209a, buttons 209b and 209c, and dials 209d and 209e which are illustrated in the exterior view of FIGS. 2A and 2B; and an unillustrated operation key, cross key, lever, or touch panel superimposed on the monitor 207, and the like. The operating unit 209 accepts the user's various operation inputs into the imaging apparatus 1, including the start and end of image capture, inputs related to the settings, or the like. The user can change/set the frame rate and the like of moving image data upon image capture and playback at the imaging apparatus 1, using the button 209b and the dial 209d forming the operating unit 209, the details of which are described below.

The input/output terminal 210 is used for connection to an unillustrated external device, for example, a display apparatus including a TV or a PC (Personal Computer). Various data are input and output between the imaging apparatus 1 and the external device via the input/output terminal 210. The input/output terminal 210 is constituted by, for example, an HDMI (High-Definition Multimedia Interface) (registered trademark) terminal or a USB (Universal Serial Bus) terminal, or the like.

The various data including the imaging data stored in the main memory 201 are output to the card recording medium 212 via a card I/F 211, and are recorded in the card recording medium. An SD (Secure Digital) memory card or the like that is detachable from the imaging apparatus 1 is used as the card recording medium 212. Another recording medium such as a DVD, a BD (Blue-ray Disc) (registered trademark), or a flash memory may be used instead of the card recording medium 212. Moreover, the imaging apparatus 1 may be constructed so as, for example, to be equipped with various memories instead of these recording media or in combination with these recording media.

A wireless module 214 transmits and receives various data to and from the external device via a wireless I/F 213 by wireless network communication. The wireless network communication uses, for example, a mode using the IEEE 802.11 series.

The central control unit 300 centrally controls each of the units mentioned above and also functions as an image capture frame rate determination unit 301, an image capture frame rate information generation unit 302, an input frame rate specification unit 303, an output frame rate specification unit 304, a playback speed specification unit 305, and a frame rate conversion unit 306. Each of the units is described below.

The image capture frame rate determination unit 301 determines a frame rate when a user captures a moving image, in other words, when the imaging apparatus 1 acquires/generates imaging data (hereinafter, simply referred to as the image capture frame rate). The imaging data may be described below as the moving image data.

The user selects a frame rate of the moving image data from, for example, seven types of frame rates of 60 fps as a <normal image capture mode>, 180 fps, 300 fps, and 600 fps as a <high-speed image capture mode>, and 1/10 fps, 1/20 fps, and 1/80 fps as a <time-lapse image capture mode>. When the button 209*b* illustrated in FIG. 21 is pressed, the monitor 207 displays an image that presents options related to these frame rates. The user rotates the dial 209*d* illustrated in FIG. 2A likewise, moves a cursor image contained in the image, and selects and sets a desired frame rate.

When the user selects the desired frame rate, the image capture frame rate determination unit 301 determines the selected frame rate as an image capture frame rate. For example, when the user selects the frame rate of 600 fps, imaging data are subsequently acquired/generated at the selected 600 fps.

In the imaging apparatus 1, the user can easily change the frame rate simply by rotating the dial 209*d*. Consequently, after imaging data is generated at a certain frame rate, it enables to quickly switch the setting to another frame rate by the operation of the dial 209*d*, and to generate another moving image data. Therefore, even if an image capture interval between an end time of certain imaging data and a start time of the next imaging data, that is, an interval between a plurality of imaging data is short, it is possible to generate imaging data at different frame rates.

The image capture frame rate information generation unit 302 generates information indicating the image capture frame rate which is determined by the image capture frame rate determination unit 301 (hereinafter simply referred to as the image capture frame rate information). The generated image capture frame rate information is associated with the acquired/generated imaging data. It is conceivable to establish the association by a method for generating and storing the image capture frame rate information as metadata in a file format such as an XML format stringed with the imaging data, by a method for embedding the generated image capture frame rate information in a predetermined area, for example a header area, of the data stream generated by the multiplexing unit 203, or the like.

The input frame rate specification unit 303 specifies a frame rate of moving image data input from the input/output I/F 206, the card I/F 211, or the wireless I/F 213 (hereinafter simply referred to as the input frame rate). Both of imaging data generated by the imaging apparatus 1 and moving image data generated by an external device other than the imaging apparatus 1 are assumed as the moving image data to be input.

Moreover, a method performed based on the image capture frame rate information, a method performed by analyzing input moving image data, and the like are conceivable as a method for specifying the input frame rate. In other words, if the image capture frame rate information or information of a similar kind, is described in a predetermined data area, or is present as metadata, the input frame rate is specified based on them. On the other hand, if the image capture frame rate information or information of a similar kind is not present, the input frame rate is specified by analyzing the frame configuration of moving image data temporarily stored in the main memory 201.

The output frame rate specification unit 304 specifies a frame rate of output moving image data when the moving image data is to be output from the input/output I/F 206, the card. I/F 211, or the wireless I/F 213 (hereinafter simply referred to as the output frame rate). A method based on selection by the user, a method based on the setting of an external device being an output destination, and the like are conceivable as a method for specifying the output frame rate.

Firstly, a description will be given of the method for specifying the output frame rate based on selection by the user. The imaging apparatus 1 can output moving image data at seven kinds of frame rates of 60 fps, 600 fps, 300 fps, 180 fps, 1/10 fps, 1/20 fps, and 1/80 fps based on the setting/ information recorded in the ROM of the central control unit 300. The monitor 207 displays an image that presents these seven options, and the user selects a desired frame rate with the operating unit 209. The output frame rate specification unit 304 specifies the selected frame rate as the output frame rate.

The user can select/set the output frame rate with the button 209*b* and the dial 209*d* illustrated in FIG. 2A, similarly to the selection/setting of the image capture frame rate. In other words, if the button 209*b* illustrated in FIG. 2A is pressed, the monitor 207 displays the image that presents these options related to the frame rates. The user rotates the dial 209*d* illustrated in FIG. 2A likewise to move a cursor image contained in the image, and select to set a desired frame rate.

Next, a description will be given of the method for specifying the output frame rate based on the setting of an external device to be an output destination of moving image data. The output frame rate specification unit 304 can also acquire information on the frame rate related to the playback of the moving image data, the frame rate having been set on the external device side, via the input/output I/F 206 or the wireless I/F 213; and specify the output frame rate based on the acquired information.

Furthermore, if the frame rate of the external device to be the output destination is limited, for example if limited only to 60 fps, it is also possible to acquire information on the model number of the connected external device, and specify the output frame rate based on the information. In this case, the output frame rate is specified based on the acquired information on the model number, and correspondence information of a model number prerecorded in the ROM of the central control unit 300 and the playable frame rate.

The playback speed specification unit 305 specifies a playback speed of the moving image data to be output. Regarding the terms of the playback speed, a playback speed, when imaging data generated by being captured for a time period T between a start time t1 and an end time t2 is played back from the start to the end for the same time period T, is set to be a normal playback speed; and the playback speed is determined by a relative speed to the normal playback speed. In other words, a case of the same playback speed as the normal playback speed is set to an equal speed, a case of faster playback than the normal playback speed is set to a high speed, and a case of slower playback is set to a low speed.

The user can select/set the playback speed using the button 209b and the dial 209d which are illustrated in FIG. 2A. In other words, if the user presses button 209b, an image for selecting the playback speed is displayed on the monitor 207. The user rotates the dial 209d to move a cursor image contained in the image, and selects and sets a desired playback speed. The playback speed specification unit 305 specifies the playback speed of the moving image data to be output based on this setting. Moreover, a predetermined playback speed (for example, only the equal speed), for example, only equal-speed playback, may be used. In this case, the playback speed specification unit 305 specifies the predetermined playback speed as the playback speed of the moving image data to be output.

The frame rate conversion unit 305 converts the frame rate of the input moving image data based on the specified output frame rate and playback speed. The conversion of the frame rate is performed based on a known method such as interpolation in addition to decimation described in the above-mentioned example. The details of the process of converting the frame rate based on the output frame rate and the playback time are described in (Playback Process of Moving Image Data by Imaging Apparatus 1) described below.

With the above configuration of the imaging apparatus 1, the moving image data generated at a different frame rate can be easily played back at a predetermined frame rate and playback speed.

Image Capture Process by Imaging Apparatus 1

Next, an image capture process (method), that is, a process (method) of generating moving image data by the imaging apparatus 1 according to the embodiment will be described. FIG. 3 is a flowchart illustrating the image capture process by the imaging apparatus 1.

When starting image capture, the user determines the image capture mode first, and selects an image capture frame rate from image capture frame rates according to the image capture modes (step S101). The imaging apparatus 1 is provided with three modes of the <normal image capture mode>, the <high-speed image capture mode>, and the <time-lapse image capture mode> as the image capture modes.

The <normal image capture mode> is an image capture mode assumed to be used most frequently in a general image capture scene such as a users daily scene, an event such as a birthday party, or a trip. In this image capture mode, imaging data is generated at 60 fps. The <high-speed image capture mode> is an image capture mode assumed to be used when the user wishes to obtain moving image data that is smoothly played back even if the motion of a subject is quick, including a sport scene. In this image capture mode, the user can select a desired image capture frame rate from three types of image capture frame rates of 600 fps, 300 fps, and 180 fps. The <time-lapse image capture mode> is an image capture mode assumed to be used when the user captures a target that makes minute changes over a long time, such as a plant growing state and the movement of the clouds. In this image capture mode, the user can select a desired image capture frame rate from three types of image capture frame rates of 1/10 fps, 1/20 fps, and 1/80 fps.

When an instruction to select the image capture mode is input via the button 209b being the operating unit 209, the audio/image processing unit 204 generates image data for such an image G41 that prompts the user to select the image capture mode as illustrated in FIG. 4A. The monitor 207 then displays the image G41. The image G41 that prompts selection includes a selection image G41A of the <normal image capture mode>, a selection image G41B of the <high-speed image capture mode>, and a selection image G41C of the <time-lapse image capture mode>.

When the user rotates the dial 209d to place an unillustrated cursor image on the selection image G41A, the <normal image capture mode> is selected. The image capture frame rate determination unit 301 then determines the image capture frame rate as 60 fps.

When the user rotates the dial 209d to place the unillustrated cursor image on the selection image G41B, the <high-speed image capture mode> is selected. The audio/image processing unit 204 then generates such an image G42 that prompts the selection of the image capture frame rate as illustrated in FIG. 4B. The monitor 207 then displays the image G42. The image G42 that prompts selection includes a selection image G42A of 600 fps, a selection image G42B of 300 fps, and a selection image G42C of 180 fps.

The user rotates the dial 209d to place the unillustrated cursor image on any of the selection images G42A, G42B, and G42C, and selects the frame rate of the <high-speed image capture mode>. The image capture frame rate determination unit 301 determines the selected frame rate as the image capture frame rate.

Returning back to FIG. 4A, when the user rotates the dial 209d to place the unillustrated cursor image on the selection image G41C, the <time-lapse image capture mode> is selected. The audio/image processing unit 204 then generates such an image G43 that prompts the selection of the image capture frame rate as illustrated in FIG. 4C. The monitor 207 then displays the image G43. The image G43 that prompts selection includes a selection image G43A of 1/10 fps, a selection image G43B of 1/20 fps, and a selection image G43C of 1/80 fps.

The user rotates the dial 209d to place the unillustrated cursor image on any of the selection images G43A, G43B, and G43C, and selects the frame rate of the <time-lapse image capture mode>. The image capture frame rate determination unit 301 determines the selected frame rate as the image capture frame rate.

In the above description, described is a case where the image capture frame rate is selected after the image for selecting the image capture mode from the <normal image capture mode>, the <high-speed image capture mode>, and the <time-lapse image capture mode> is illustrated, but the method for selecting the image capture frame rate is not limited to this. For example, only the selection image of the frame rate is changed/selected in accordance with the operation of the dial 209d without displaying the selection image of each image capture mode.

Returning back to FIG. 3, when the image capture mode is set and the image capture frame rate is selected as described above (YES in step S101), the central control unit 300 changes the image capture frame rate based on the information prerecorded in the ROM (step S102). If the user does not set the image capture mode MO in step S101), the image capture frame rate, which was used the previous time or which is the image capture frame rate to be preset upon turning-on of power, is used as it is without changing the image capture frame rate.

If the central control unit 300 performs such things as changing the image capture frame rate as described above, the image capture frame rate determination unit 301 determines the image capture frame rate where the change and the like are made, as the frame rate of imaging data related to subsequent image capture (step S103).

If the user presses a recording button of the operating unit 209 to start recording (image capture) (YES in step S104), image capture frame rate information of imaging data to be generated is generated first (step S105). Then frames are sequentially generated based on the image capture frame rate and imaging data is generated (step S106).

Figure 5:
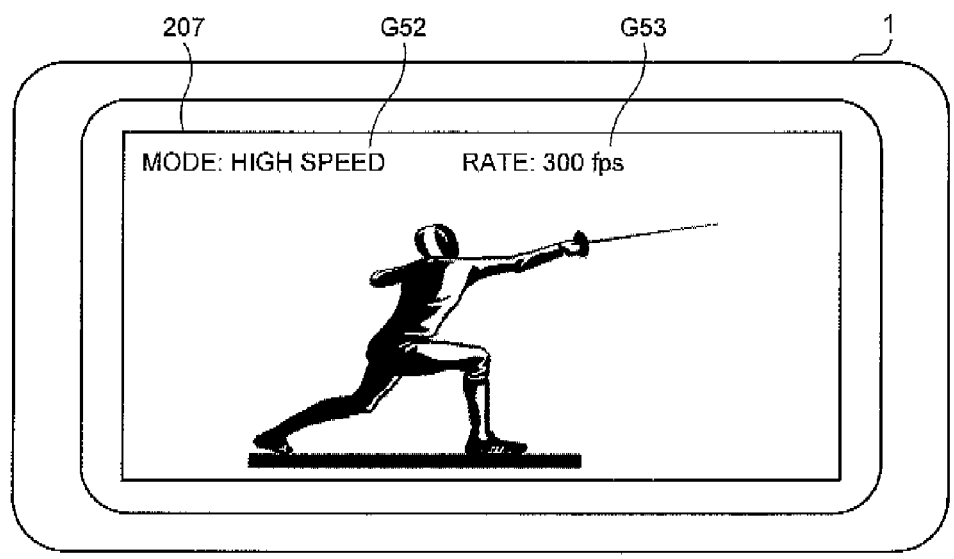
FIG. 5 is a schematic diagram of an image that the imaging apparatus 1 can display on a monitor during image capture.

At this point, the monitor 207 displays a through image related to the generated imaging data. Images showing the image capture mode and the image capture frame rate that have been selected by the user are respectively superimposed on the through image. FIG. 5 is a diagram schematically illustrating an example of the through image to be displayed.

The audio/image processing unit 204 generates image data on an image G52 indicating the selected image capture mode based on input information selected by the user in the image capture mode setting process of step S101. Moreover, image data on an image G53 indicating the image capture frame rate is generated based on the image capture frame rate information.

If the user releases the recording button of the operating unit 209 to end the recording (YES in step S107), the generated imaging data and image capture frame rate information are associated with each other and is recorded in the card recording medium 212 (step S108). As long as the user continues pressing the recording button and does not end the recording (NO in step S107), the generation of imaging data is continued.

As described above, in the imaging apparatus 1, imaging data is generated whenever the user presses the recording button. The generated imaging data as well as image capture frame rate information is then recorded in the card recording medium 212. Since the image capture frame rate can be changed/set for each piece of imaging data to be recorded, the user can obtain a plurality of imaging data each having a different frame rate.

Playback Process of Moving Image Data by Imaging Apparatus 1

Next, a description will be given of a playback process (method) of moving image data by the imaging apparatus 1 according to the embodiment. FIG. 6 is a flowchart illustrating the playback process of moving image data by the imaging apparatus.

When the imaging apparatus 1 plays back the moving image data, the output frame rate specification unit 304 first specifies the output frame rate of the moving image data to be output for playback (step S201). As described above, the method based on selection by the user, the method based on the setting of an external device being an output destination, and the like are conceivable as, the method for specifying the output frame data.

Figure 7A:
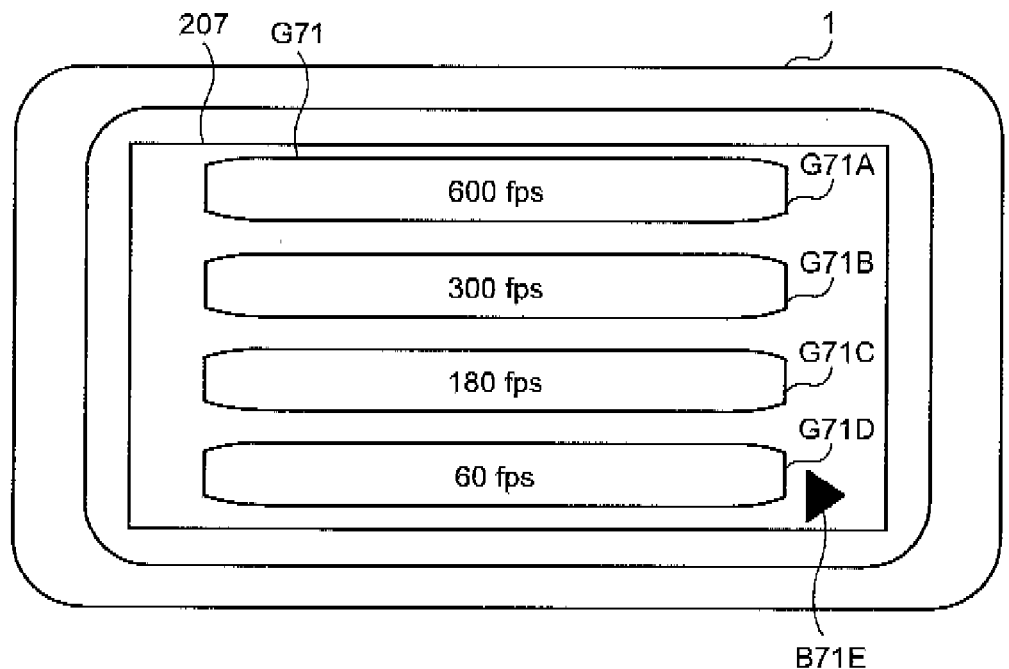
FIGS. 7A and 7B are diagrams schematically illustrating the displays of images that prompt a user to select an output frame rate.
Figure 7B:
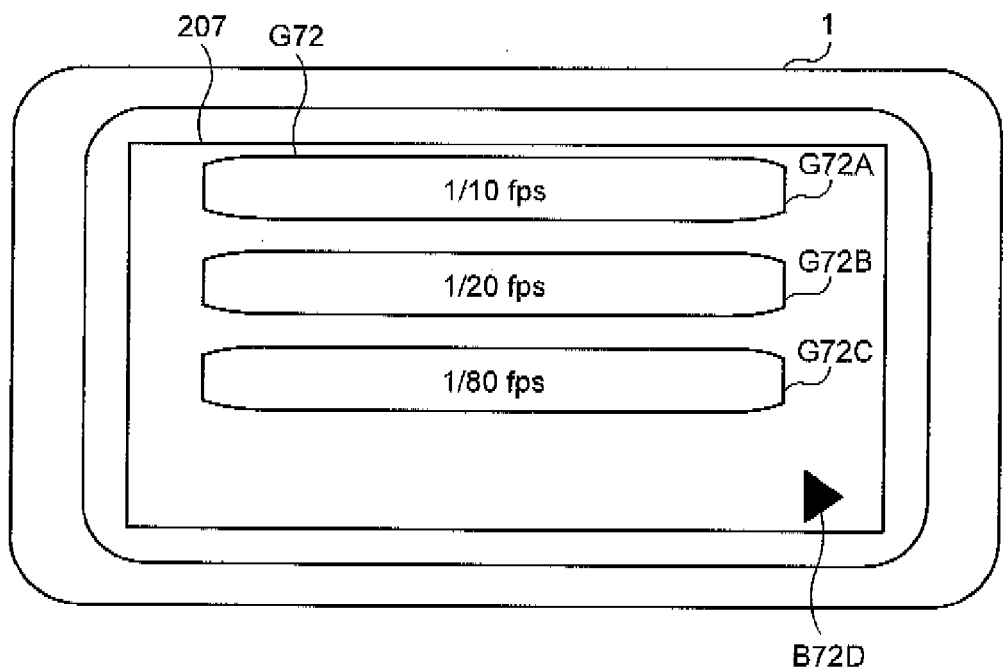

If the output frame rate is specified based on selection by the user, the audio/image processing unit 204 generates image data on an image that prompts the user to make a selection. The image that prompts selection is then displayed on the monitor 207. FIGS. 7A and 7B are diagrams schematically illustrating the displays of images that prompt the user to select the output frame rate.

If an instruction to the effect to select the output frame rate is input via the operating unit 209, the audio/image processing unit 204 generates image data on such an image G71 that prompts the user to select the output frame rate as illustrated in FIG. 7A. The monitor 207 then displays the image G71. The image G71 that prompts selection includes a selection image G71A of 600 fps, a selection image G71B of 300 fps, a selection image G71C of 180 fps, a selection image G71D of 60 fps, and an image B71E that prompts transition to an image that displays the other selection images.

If the user rotates the dial 209d to place an unillustrated cursor image on any selection image of the images G71A, G71B, G71C, and G71D, the frame rate corresponding to the selection image is selected. The output frame rate specification unit 304 specifies the selected frame rate as the output frame rate.

If the user rotates the dial 209d to place an unillustrated cursor image on the image B71E that prompts transition to the image that displays the other selection images, the audio/image processing unit 204 generates image data on an image G72 that prompts the user to select the output frame rate. The monitor 207 then displays the image G72. The image G72 that prompts selection includes a selection image G72A of 1/10 fps, a selection image G72B of 1/20 fps, a selection image G72C of 1/80 fps, and an image B72D that prompts transition to an image that displays the other selection images (return to the image G71).

If the user rotates the dial 209d to place an unillustrated cursor image on any selection image of the images G72A, G72B, and G72C, the frame rate corresponding to the selection image is selected. The output frame rate specification unit 304 specifies the selected frame rate as the output frame rate. If the user rotates the dial 209d to place the unillustrated cursor image on the image G72D that prompts transition to the image that displays the other selection images, the image to be displayed returns to G71.

Next, a description will be given of a case where the output frame rate is specified based on the setting of an external device being an output destination. There is also a case where the user outputs the input moving image data to an external device such as a display apparatus connected via the input/output I/F 206 and the input/output terminal 210, or the wireless I/F 213 and the wireless module 214. In such a case, assumed are such that the frame rate of moving image data to be played back is set for the display apparatus, and that the display apparatus or the like can play back moving images only at limited frame rates.

If the user has set the frame rate of the moving image data to be played back for the connected external device such as a display apparatus, the output frame rate specification unit 304 acquires, via the input/output I/F 206 or the wireless I/F 213, information on the frame rate that has been set on the external device side related to the playback of the moving image data. The output frame rate specification unit 304 then specifies the output frame rate based on the acquired information.

If the display apparatus or the like can play back moving image only at a limited frame rate, the output frame rate specification unit 304 acquires information on the model number of the connected external device. The output frame rate specification unit 304 then specifies the output frame rate based on the information.

Returning back to FIG. 6, if the output frame rate specification unit 304 specifies the output frame rate in step S201, the playback speed specification unit 305 determines the playback speed of the moving image data to be output (step S202).

The imaging apparatus 1 can output the input moving image data for playback at various speeds of high speed, equal speed, and low speed compared to the normal playback speed. Hereinafter, a description will be given assuming a case of the high speed as a double speed relative to the equal speed and a case of the low speed as a half speed relative to the equal speed, for facilitation of description and understanding. These numerical values are illustrations and, obviously, a plurality of kinds of speeds can be applied to each of the low speed and the high speed.

In terms of the playback speed, a playback speed, when moving image data generated by being captured only for the time period T between the start time t1 and the end time t2 is played back from the start to the end for the same time period T, is set to be a normal playback speed; and the playback speed is determined by a relative speed to the normal playback speed. In other words, a speed, at which imaging data generated spending 10 minutes from the start time to the end time is played back for 10 minutes, likewise is the equal speed.

In contrast, a speed, at which the imaging data generated spending 10 minutes from the start time to the end time is played back for five minutes, is the high speed. In this case, the decimation process described below is performed by the frame rate conversion unit 306 in a manner of reducing the total number of frames of the imaging data to a half. For example, the moving image data whose frame rate has been converted to 30 fps is output/played back at an output frame rate of 60 fps for five minutes.

Moreover, the imaging data generated spending 10 minutes from the start time to the end time is played back at a speed spending 20 minutes, of which speed is a low-speed frame; and in this case, the total number of frames of the imaging data is interpolated to be doubled by the frame rate conversion unit. For example, the moving image data whose frame rate has been converted to 120 fps is output/played back at the output frame rate of 60 fps for 20 minutes.

Figure 8:
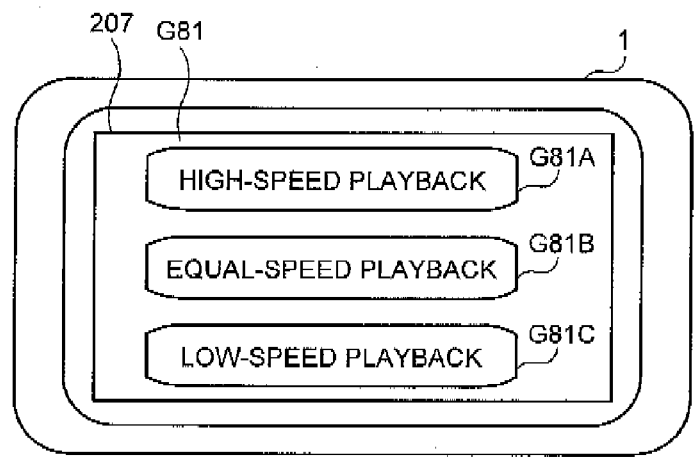
FIG. 8 is a diagram schematically illustrating the display of an image that prompts the user to select a playback speed.

The playback speed specification unit 305 can specify the playback speed based on selection by the user from the high speed, equal speed, and low speed. When an instruction to the effect to select the playback speed of the moving image data to be output is input via the operating unit 209, the audio/image processing unit 204 generates such an image G81 that prompts the user to select the playback speed as illustrated in FIG. 8. The monitor 207 then displays the image G81. The image G81 that prompts selection includes a selection image G81A of <high-speed playback>, a selection image G81B of <equal-speed playback>, and a selection image G81C of <low-speed playback>.

If the user rotates the dial 209d to place an unillustrated cursor image to the selection image G81A, <high-speed playback> is selected. The playback speed specification unit 305 then specifies a double speed relative to the equal speed as the playback speed. Similarly, the playback speed specification unit 305 specifies, as the playback speed, a speed one time as fast as the equal speed if the unillustrated cursor image is placed on the selection image G81B; and a speed half as fast as the equal speed if the unillustrated cursor image is placed on the selection image G81C.

The playback speed specification unit 305 can also specify, as the playback speed, a predetermined specific speed as the playback speed regardless of the designation of how many times as fast by the selection by the user.

Returning to FIG. 6, if the playback speed is specified in step S202 and the user instructs the output of the moving image data via the operating unit 209 (YES in step S203), the moving image data is input (step S204). The moving image data is input via the input/output I/F 206, the card I/F 211, or the wireless I/F 213.

In terms of the moving image data to be input, the user can both designate only one desired piece of moving image data and designate the input of a plurality of moving image data. Hereinafter, a description will be given of a case where the input of a plurality of moving image data is designated. For example, a method where the user designates a predetermined directory and inputs all the moving image data included in the directory, and a method for designating a previously created play list including a plurality of moving image data are conceivable as a method for inputting a plurality of moving image data.

If first moving image data of the plurality of moving image data is input in step S204, the input frame rate specification unit 303 specifies a frame rate of the moving image data input first (step S205). The method performed based on the image capture frame rate information, the method performed by analyzing moving image data to be input, and the like are conceivable as the method for specifying the input frame rate.

In other words, if the image capture frame rate information or information of a similar kind is described in a predetermined data area, or exists as metadata, the input frame rate is specified based on them. On the other hand, if the image capture frame rate information or information of a similar kind is not included, the input frame rate is specified by analyzing the frame configuration of the moving image data.

If the input frame rate is specified in step S205, the frame rate conversion unit 306 changes the frame rate based on the specified input frame, the output frame rate specified in step S201, and the playback speed specified in step S202 (step S206). The frame rate conversion unit 306 changes the frame rate of the moving image data to be output by changing the total number of frames of the input moving image data by a known decimation or interpolation method.

Assuming the specified input frame rate is Fin, the output frame rate is Fout, and the multiplier of the playback speed relative to the equal speed is M, a change multiplier x of the total number of frames of the input moving image data has a relationship expressed in the following equation (1).

$$x = Fout/M*Fin \qquad (1)$$

Therefore, for example, if the output frame rate is specified as 60 fps in step S201, the playback speed as the equal speed in step S202, and the input frame rate of the first moving image data input in step S204 as 600 fps, the frame rate conversion unit 306 sets the total number of frames of moving image data to be output as one tenth of the total number of frames of the input moving image data.

The moving image data whose frame rate was changed in step S206 is output from the input/output I/F 206, the card I/F 211, or the wireless I/F 213 (step S207).

Consequently, for example, if the user has set a frame rate at the time of playback of moving image data to 60 fps, and even if 10 minutes' moving image data generated at 600 fps is input, it becomes possible to appropriately output and play back the moving image data in 10 minutes.

In other words, the frame rate conversion unit 306 changes the frame rate of the input moving image data based on the input frame rate, the output frame rate, and the playback speed; and accordingly the user can enjoy the playback of a moving image at a frame rate appropriate to his/her playback environment and at an intended playback speed.

If the output of the first moving image data is completed and the user does not stop the output of moving image data (NO in step S208), second moving image data is input (step S204; N=2). The input frame rate of the second moving image data is then specified (step S205; N=2). The frame rate conversion unit 306 converts the frame rate based on the output frame rate specified in step S201, the playback speed specified in step S202 (here, the equal speed), and the specified input frame rate of the second moving image data (step S207).

For example, if the input frame rate of the second moving image data is specified as 300 fps here, the frame rate conversion unit 306 changes the frame rate to reduce the total number of frames to one fifth based on the equation (1). The second moving image data is then output at the changed frame rate so as to have the equal-speed playback (step S207; N=2).

As described above, if the moving image data generated at different frame rates (in the above example, 500 fps for the first moving image data, and 300 fps for the second moving image data) are sequentially/continuously played back, the frame rate conversion unit can convert the frame rate of each piece of the moving image data so as to have a predetermined output frame rate and the same playback speed between the first and second moving image data.

From this point on, if the user does not stop the output of moving image data or the output of a plurality of specified moving image data is not completed (NO in step S208), the processes from steps S204 to S207 are repeated. If the user stops the output of moving image data via the operating unit 209 (YES in step S208), the playback process of moving image data by the imaging apparatus 1 is completed.

As described above, according to the imaging apparatus 1, even if playing back a plurality of moving image data generated at different frame rates sequentially from a medium or the like where the plurality of moving images is mixed and recorded, the user can perform playback by easily and appropriately adjusting the output frame rate of each piece of the moving image data and a playback speed so as for the each moving image data to be the same speed between each moving image data without adjusting the frame rate and the playback speed for each piece of the moving image data.

In the imaging apparatus 1, the user can also change the playback speed as occasion arises at the midpoint of playback of an N-th moving image, or when switching to playback of an N+1-th moving image. In this case, a change method is conceivable, such as making the speed faster by a predetermined multiplier whenever the dial 209d of the operating unit 209 is rotated.

In this case, the central control unit 300 generates information to change the multiplier of the playback speed whenever the dial 209d of the operating unit 209 is rotated. The playback speed specification unit 305 then specifies a new playback speed based on the generated information, the specified output frame rate, and the current playback speed.

Display Aspect of Output Moving Image Data

Figure 9:
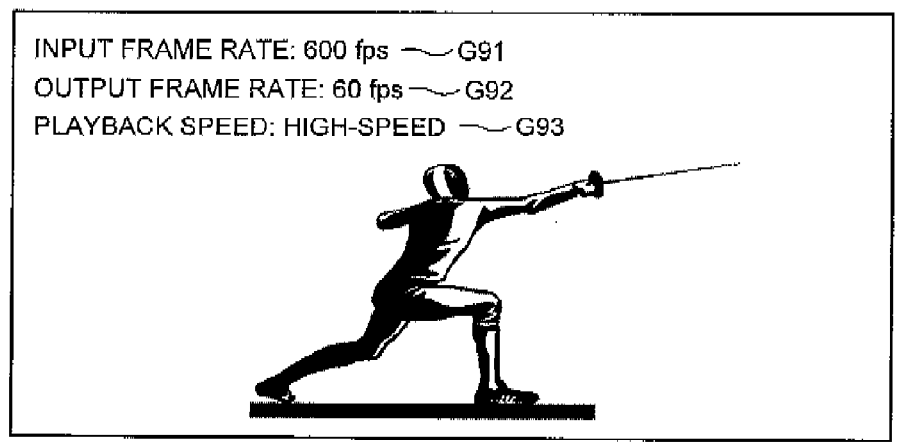
FIG. 9 is a schematic diagram illustrating a display example of output moving image data.

Next, a description will be given of the display of the moving image data output and played back by the abovementioned Playback Process of Moving Image Data by Imaging Apparatus 1. FIG. 9 is a schematic diagram illustrating a display example of the output moving image data.

As described above, with the imaging apparatus 1 according to the present invention, the frame rates of a plurality of moving images generated at different frame rates are respectively converted to output the plurality of moving images. Moreover, at this point, frame decimation and interpolation are performed based on a preset playback speed.

Hence, the audio/image processing unit 204 of the imaging apparatus 1 can generate image data for presenting these pieces of information to the user. An image related to the generated image data is displayed on the monitor 207 or an external display apparatus.

In other words, the audio/image processing unit 204 generates image data that presents the input frame rate to the user based on the input frame rate specified by the input frame rate specification unit 303. In the schematic diagram of FIG. 9, a case where the input frame rate is 600 fps is taken as an example, and an image G91 that presents the input frame rate is illustrated.

Moreover, the audio/image processing unit 204 generates image data that presents, to the user, the playback speed specified by the playback speed specification unit 305 based on the specified playback speed. In the schematic diagram of FIG. 9, a case where the playback speed is specified as high-speed playback of a double speed relative to the equal-speed playback is taken as an example, and an image G93 that indicates the playback speed is illustrated.

The audio/image processing unit 204 then generates image data that presents, to the user, the output frame rate specified by the output frame rate specification unit based on the specified output frame rate. In the schematic diagram of FIG. 9, a case, where 60 fps is specified as the output frame rate, is taken as an example, and an image G92 that indicates the output frame rate is illustrated.

As described above, with the imaging apparatus 1 according to the present invention, the user can visually recognize various pieces of information such as the input frame rate, the playback speed, and the output frame rate for each piece of the input moving image data.

It can be configured that the user recognizes the playback speed and various frame rates by not the above-mentioned image display on the monitor and the like but by another means. For example, it can be configured that the user recognizes them by means such as that an LED light source is provided to the imaging apparatus 1, where the LED light source is not lit up in a case at equal-speed playback, and lighting is repeated at short intervals in a case at high-speed playback, and lighting is repeated at longer intervals than the case of high-speed playback in a case at low-speed playback.

Modification

If data is transmitted and received via wireless network communication, a communication bandwidth of the network may change and the data amount that communication admits may change according to the bandwidth change. Hereinafter, in terms of a process when the imaging apparatus 1 outputs moving image data to an external device via the wireless I/F 213 and the wireless module 214, a modification of the embodiment will be described.

Compared with the embodiment mentioned above, the modification is different in the process related to the specification of the output frame rate in S201 of the flowchart of FIG. 6, and the other processes are the same in principle. Therefore, a description will be given about the specification of the output frame rate by the output frame rate specification unit 304 and the descriptions of the other processes will be omitted.

The imaging apparatus 1 can convert the frame rate of moving image data recorded in the card recording medium 212 or moving image data input via the input/output terminal 210 based on the input frame rate, the playback speed, and the output frame rate; and can output the converted moving image data to the external device via the wireless module 214. Assumed is a tablet PC or a smartphone, for example, as the external device that supports wireless network communication likewise and includes a display monitor.

When the output frame rate specification unit 304 specifies the output frame rate, it is possible to specify the output frame rate based on a bandwidth in the network communication with the above-mentioned external device. In this case, the output frame rate specification unit 304 measures how many frames of moving image, which is a target of transmission and is temporarily stored in the main memory 201, are being transmitted per second. How many frames are being transmitted per second, in other words, a frame transmission speed is calculated based on the measurement result.

The output frame rate specification unit 304 then specifies the calculated frame transmission speed as the output frame rate. The output frame rate specification unit 304 specifies the output frame rate based on the transmission speed of the frame at predetermined timing.

As described above, according to the embodiment, even if the data amount that can be transmitted by the imaging apparatus 1 is changed due to a change in the communication bandwidth of the wireless network communication and the like, the output frame rate is specified based on the transmission speed at the time. Therefore, even if the number of frames of moving image data to be transmitted is changed, the external device can play back the moving image data at a playback speed that the user desires.

Hereinafter, a description will be given of an embodiment based on another method of setting the image capture frame rate and the playback speed in accordance with the operation of the dial 209*d*, and display method on the monitor 207 using FIGS. 10 to 12.

Figure 10:
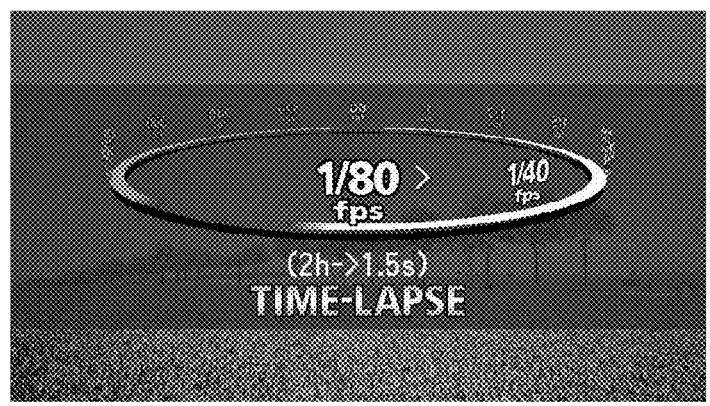
FIG. 10 is a diagram illustrating an example of a display when selecting a low frame rate and high-speed playback.
Figure 11:
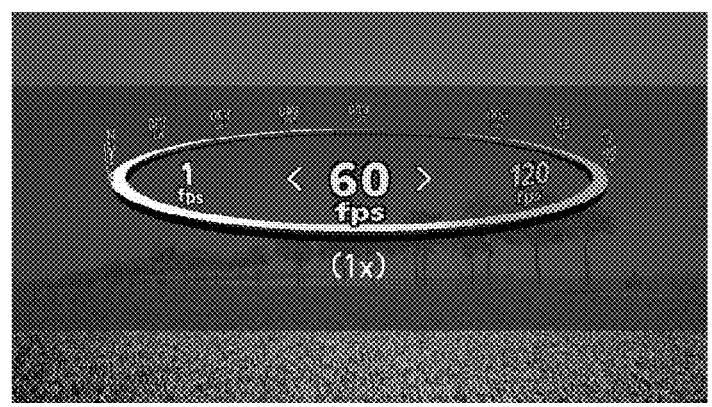
FIG. 11 is a diagram illustrating an example of a display when selecting a normal frame rate and equal-speed playback.
Figure 12:
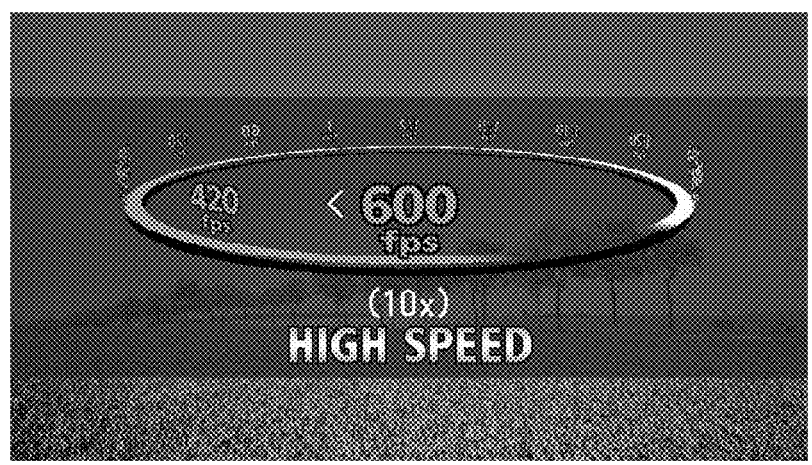
FIG. 12 is a diagram illustrating an example of a display when selecting a high frame rate and low-speed playback.

FIGS. 10 to 12 illustrate examples of a selection screen to be displayed upon the selection of the image capture frame rate at the time of image capture, and a selection screen to be displayed upon the selection of the playback speed at the time of playback.

In the embodiment, the <normal image capture mode>, the <high-speed image capture mode>, and the <time-lapse image capture mode> are not selected as separate modes; but a selection is made referring to the image capture frame rate (50 fps) at the time of normal image capture upon image capture, and to the playback speed (1×) at the time of equal-speed playback upon playback. Consequently, the modes are not provided as totally separate modes, but it becomes possible to control image capture and playback continuously by the image capture frame rate and the playback speed at the time of playback.

Specific operations of image capture by the image capture frame rate and the playback speed, and the selection of the playback method will be specifically described using FIGS. 10 to 12.

Firstly, a description will be given taking at the time of image capture as an example. In the embodiment, it is possible to continuously set the image capture frame rate to be an arbitrary image capture frame rate from the lowest to the highest. Moreover, the image capture frame rate may be set to be selectable in a stepwise manner, which is displayed as: 1/80 fps, 1/40 fps, 1/20 fps, 1/10 fps, 1/5 fps, 1/2 fps, 1 fps, 60 fps, 120 fps, 240 fps, 300 fps, 420 fps, and 600 fps.

The dial 209*d* is rotated when the image capture frame rate is to be selected and accordingly arbitrary image capture frame rates can be selected continuously; or the displayed image capture frame rates can be selected in stepwise manner. Here, if the button 209*b* is pressed in a state where the image capture frame rate is selected, the image capture frame rate at the time of image capture can be determined.

With this operation, it is possible to change the image capture frame rate operated in step S102 and determine the image capture frame rate operated in step S103 without setting the mode operated in step S101 illustrated in FIG. 3.

On the monitor 207, displayed are a start point and an end point arranged on a screen, and the image capture frame rates from a low rate to a high rate are arranged in a ring shape from the start point to the end point. In FIGS. 10 to 12, the low rate is displayed on the left end, and the high rate on the right end. For example, the start point is displayed as the lowest image capture frame rate (for example, 1/80 fps), and the end point as the highest image capture frame rate (for example, 600 fps); and a numerical value, between the lowest image capture frame rate displayed on the front side of the ring shape and the highest image capture frame rate, is highlighted and the like so as to be displayed in an easily recognizable manner.

If the dial 209*d* is rotated counterclockwise, the display of the numerical values of the image capture frame rates rotates counterclockwise on the ring in synchronization with the dial 209*d*, as if the ring-shaped arrangement, where the image capture frame rates are arranged, is rotated. If the dial is similarly rotated clockwise, the ring-shaped arrangement also rotates clockwise. At this point, the image capture frame rate displayed on the front side of the ring shape is the selected image capture frame rate.

Using FIGS. 10 to 12 for a description, if the dial 209*d* is rotated counterclockwise from the state of FIG. 11 where 60 fps is selected, it switches to FIG. 10 (for example, 1/80 fps). If the dial 209*d* is rotated clockwise from the state of FIG. 11, it switches to FIG. 12 (for example, 600 fps).

Consequently, the operation to rotate the dial 209*d* is synchronous with the rotation of the numerical values of the image capture frame rates displayed on the monitor 207, and accordingly it is possible to intuitively recognize the image capture frame rate to be selected. Moreover, it is possible to perform a setting faster than selecting the image capture frame rate after selecting the image capture mode.

Next, a description will be given taking at the time of playback as an example. In the embodiment, it is possible to continuously set, as the playback speeds, arbitrary playback speeds from a high playback speed to a low playback speed. The playback speed here is a playback speed corresponding to an image capture frame rate. Moreover, it can be configured that the playback speed is set to be selectable in stages from playback speeds displayed as the image capture frame rates. The dial 209*d* is rotated when the playback speed is selected, and accordingly it is possible to make selections continuously or in a stepwise manner. This operation corresponds to the specification of the playback speed in step S202 in FIG. 6.

In terms of display on the monitor 207, a start point and an end point are arranged and displayed on the screen; and a high playback speed to a low playback speed are arranged in a ring shape from the start point to the end point. For example, the start point is displayed as a high playback speed (for example, a playback speed of 1/80 fps), and the end point as a low playback speed (for example, a playback speed of 600 fps); and a numerical value, between the high playback speed displayed on the front side of the ring shape and the low playback speed, is highlighted and the like so as to be displayed in an easily recognizable manner.

If the dial 209*d* is rotated counterclockwise, the display of the numerical values of the playback speeds rotates counterclockwise on the ring in synchronization with the dial 209*d* as if the ring-shaped arrangement, where the playback speeds are arranged, is rotated. If the dial is similarly rotated clockwise, the ring-shaped arrangement also rotates clockwise. Here, the playback speed displayed on the front side of the ring shape is the selected playback speed.

Consequently, the operation to rotate the dial 209*d* is synchronous with the display where the numerical values of the playback speeds rotate on the monitor 207 and accordingly it is possible to intuitively recognize the selected playback speed.

Here, it can be configured that the image capture frame rate and the playback speed be displayed concurrently. For example, the image capture frame rate, and the playback speed corresponding to the image capture frame rate may be displayed. Displayed can be 600× that indicates a playback speed 600 times as fast as the normal playback corresponding to 1/60 fps; 1× corresponding to 60 fps; and 1/10× corresponding to 600 fps respectively.

At this point, the image capture frame rate and the playback speed may be noticeably displayed if the image capture frame rate is selected and if the playback speed is selected, respectively.

Moreover, it may be displayed for a frame rate lower than 50 fps that it is the time-lapse image capture mode; for 60 fps that it is the normal image capture mode; and for a frame rate higher than 50 fps that it is high-speed image capture mode, respectively.

Consequently, it is possible to make selections while considering into a playback speed at the time of playback upon image capture, and to make selections while considering into a frame rate at the time of image capture upon playback. Consequently, it becomes easy to reflect the user's intention of image capture.

As described in the embodiments and the modification, according to the present invention, it becomes possible to easily play back moving image data generated at various frame rates at an arbitrary frame rate and playback speed. The present invention is not limited to an electronic device that generates moving image data through image capture by an imaging unit as in the imaging apparatus 1, but can be realized as long as it is a device that can input and output a moving image.

According to the moving image data processing apparatus and the moving image data processing method described above, it becomes possible to easily play back moving image data generated at different frame rates at a predetermined frame rate and playback speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth,

What is claimed is:

1. A moving image data processing apparatus comprising:
a moving image data input unit configured to be input of
first moving image data generated at a first frame rate and second image data generated at a second frame rate that is different from the first frame rate;
an input frame rate specification unit configured to specify the first frame rate of the first moving image data and the second frame rate of the second moving image data, the first and second moving image data having been input into the moving image data input unit;
an output frame rate specification unit configured to specify
output frame rate of the first moving image data and output frame rate of the second moving image data that have been input into the moving image data input unit;
a playback speed specification unit configured to specify a same playback speed for the first moving image data and the second moving image data;
a frame rate conversion unit configured to
change a frame rate of the first moving image data based on the first frame rate, the output frame rate, and the playback speed, and
change a frame rate of the second moving image data based on the second frame rate, the output frame rate, and the playback speed; and
a moving image data output unit that outputs the first and second moving image data whose frame rates have been converted by the frame rate conversion unit.

2. The moving image data processing apparatus according to claim 1, further comprising
an operating unit configured to accept an input to specify the playback speed, wherein
the playback speed specification unit specifies the playback speed based on the input that is accepted by the operating unit.

3. The moving image data processing apparatus according to claim 1, further comprising a display unit, wherein
the operating unit accepts the inputs continuously, and
the moving image data output unit
makes the display unit display the first frame rate, second frame rate, or the playback speed thereon arranged in a circular ring shape,
makes the display unit display the circular ring shape of the first frame rate, second frame rate, or the playback speed in a rotating manner in accordance with the input of the operating unit, and
specifies the first frame rate, the second frame rate, or the playback speed.

4. The moving image data processing apparatus according to claim 1, wherein
the output frame rate specification unit is configured to specify the output frame rate based on information of an external device receiving the moving image data output by the moving image data output unit.

5. The moving image data processing apparatus according to claim 1, wherein
the output frame rate specification unit is configured to specify the output frame rate based on network band information of an external device receiving the moving image data output by the moving image data output unit.

6. A moving image data processing method comprising:
inputting first moving image data generated at a first frame rate and second image data generated at a second frame rate that is different from the first frame rate;
specifying the first frame rate of the first moving image data and the second frame rate of the second moving image data,
the first and second moving image data having been input;
specifying
output frame rate of the first moving image data and output frame rate of the second moving image data that have been input
specifying a same playback speed for the first moving image data and the second moving image data;
changing a frame rate of the first moving image data based on the first frame rate, the output frame rate, and the playback speed, and
changing the frame rate of the second moving image data based on the second frame rate, the output frame rate, and the playback speed; and outputting the first and second moving image data whose frame rates have been changed.

* * * * *